No. 812,479. PATENTED FEB. 13, 1906.
J. W. BROADHEAD & F. W. ORDISH.
APPARATUS FOR DISCHARGING GAS RETORTS.
APPLICATION FILED JUNE 19, 1905.
5 SHEETS—SHEET 4.
Fig. 4.
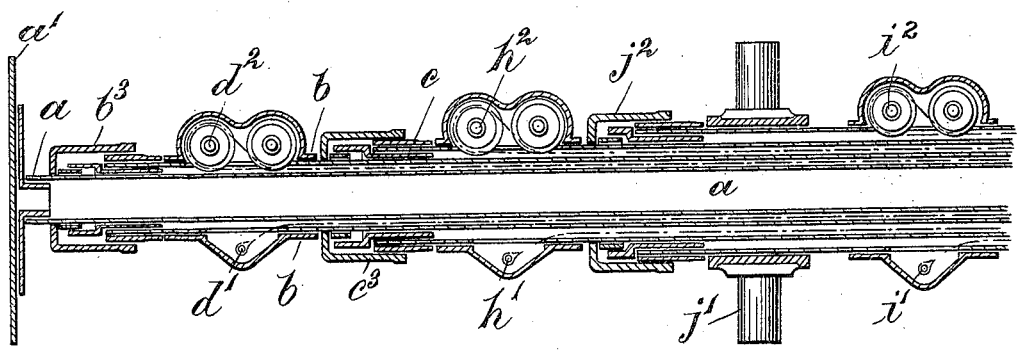
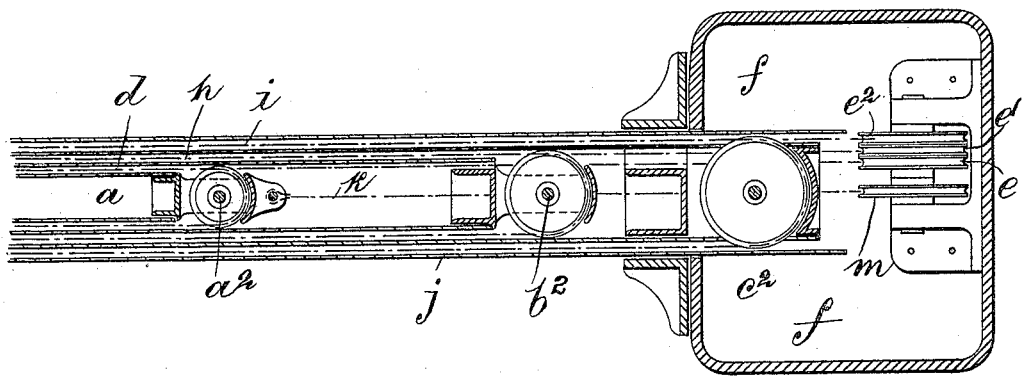
Witnesses:
J. Grigg Poole
L. B. Middleton
Inventors:
John W. Broadhead
and Francis W. Ordish
by Herbert W. T. Jenner.
Attorney.

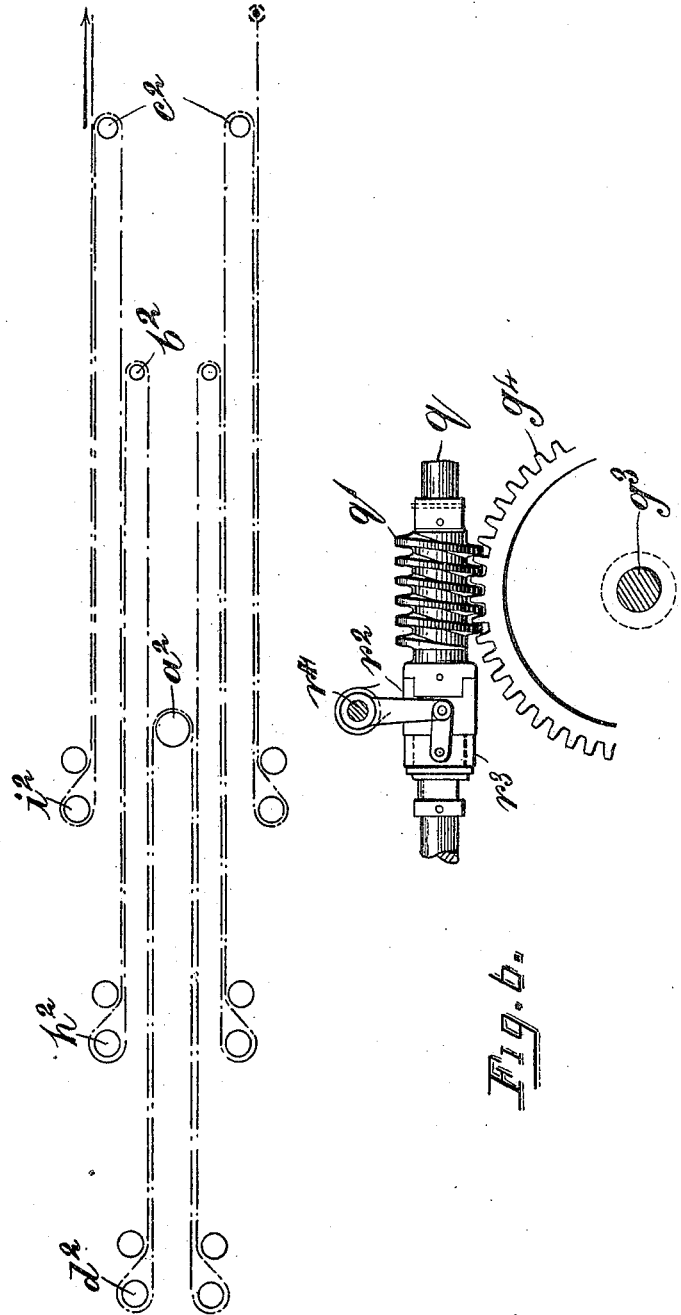

UNITED STATES PATENT OFFICE.

JOHN WILSON BROADHEAD AND FRANCIS WESSELY ORDISH, OF ELLAND, ENGLAND, ASSIGNORS TO ROBERT DEMPSTER & SONS, LTD., OF ELLAND, ENGLAND.

APPARATUS FOR DISCHARGING GAS-RETORTS.

No. 812,479.      Specification of Letters Patent.      Patented Feb. 13, 1906.

Application filed June 19, 1905. Serial No. 265,916.

*To all whom it may concern:*

Be it known that we, JOHN WILSON BROADHEAD and FRANCIS WESSELY ORDISH, residing at Elland, in the county of York, England, have invented certain new and useful Improvements in Apparatus for Discharging Gas-Retorts; and we do hereby declare the following to be a full, clear, and exact description of the invention, such as will enable others skilled in the art to which it appertains to make and use the same.

The object of this invention is to obviate certain difficulties hitherto experienced in the discharging of horizontal gas-retorts and the like.

Our improvements consist, first, in a new arrangement of tubular telescopic rakes or rams and means of operating same for pulling or pushing out the coke or other material in the retorts and for cooling the said rakes or rams while in action; secondly, in an improved carriage for traversing the rakes or rams along the retort-house from one set of retorts to another, on which carriage is arranged the necessary gear for lifting, lowering, deflecting, extending, and collapsing the telescopic rake or ram, the power used being steam, electric, hydraulic, or pneumatic, or being received by ropes, belts, or otherwise from any convenient source.

Figure 1:
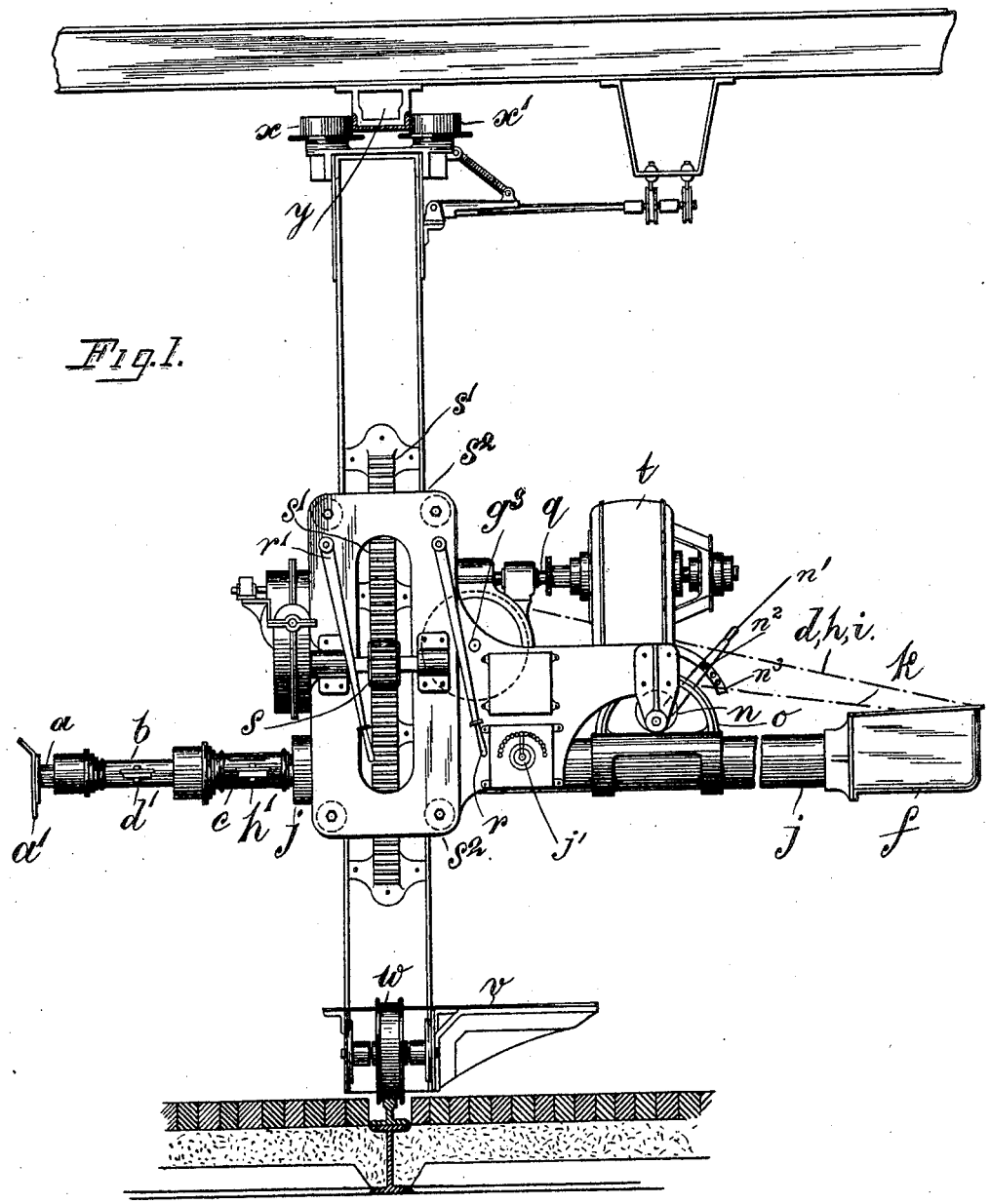
Figure 2:
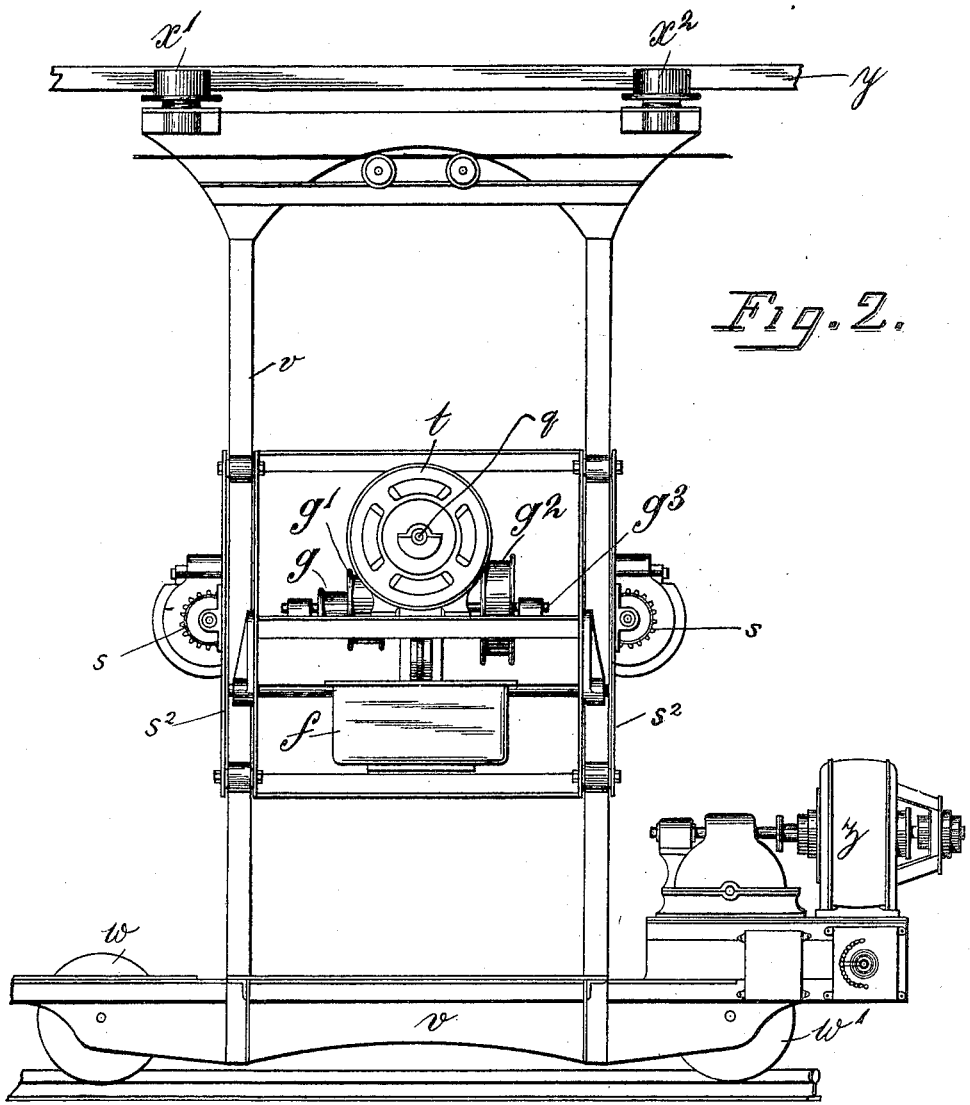
Figure 3:
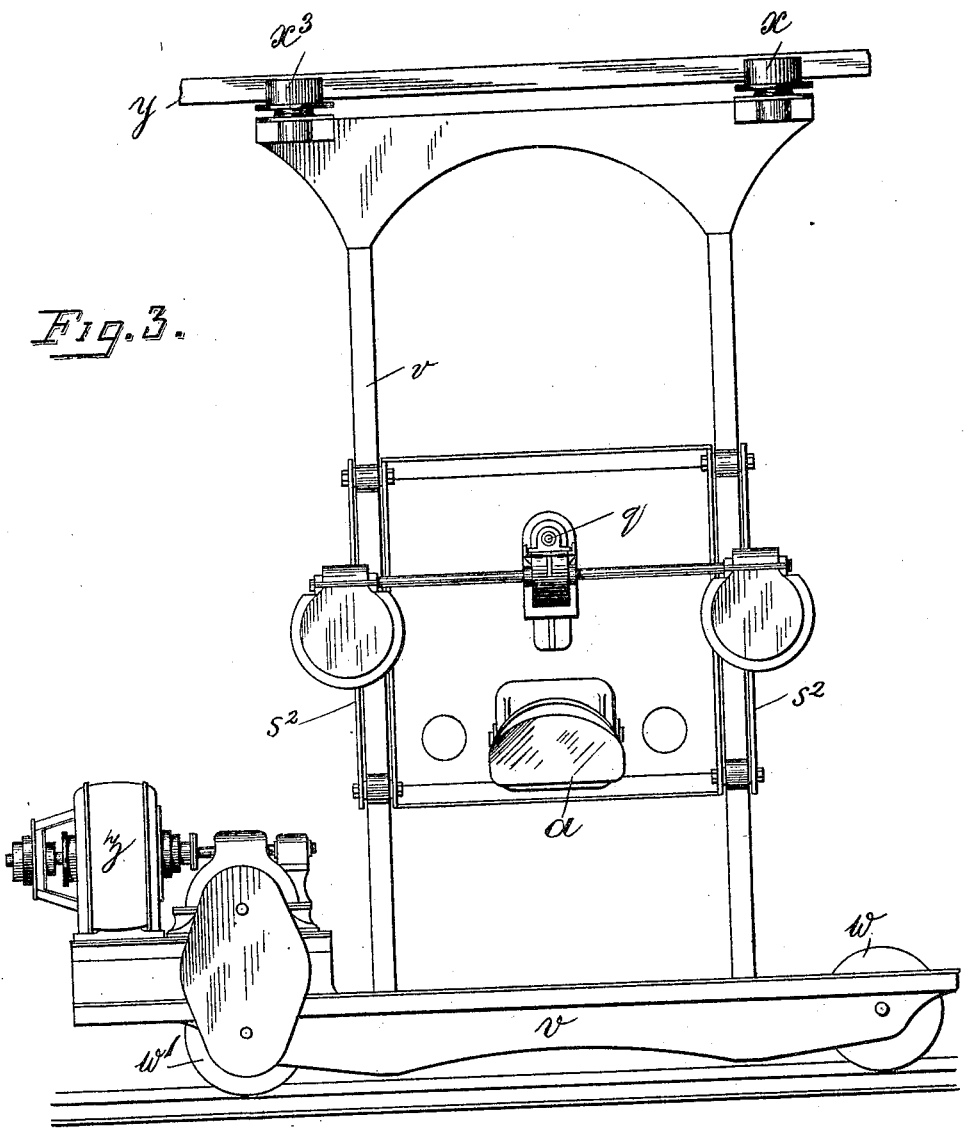

In the accompanying sheets of drawings, Figure 1 is a side elevation of a machine embodying our improvements. Fig. 2 is an elevation of the rear of the said machine. Fig. 3 is an elevation of the front thereof. Fig. 4 is a horizontal section, on a larger scale, through the tubular rams. Fig. 5 is a diagram illustrating a modification hereinafter referred to. Fig. 6 is a detail of a portion of the driving mechanism.

According to our invention we construct the body of the rake or ram of three or other number of tubes or the like $a\ b\ c$, arranged telescopically, the smallest tube $a$, which has the farthest extension, carrying the working head $a'$. At the rear end of this leading tube $a$ is a pulley $a^2$, around which passes a wire rope or chain $d$, fastened to a pin $d'$, and also passing over a pulley or pulleys $d^2$, secured to the tube $b$, over a pulley $e$ in the tank $f$, and thence to a fixed point above the tubes.

The second or middle tube $b$ is similarly provided with a pulley $b^2$, engaged by wire rope or chain $h$, fastened to a pin $h'$ on the rear tube and passing over pulleys $h^2\ e'$ and being then wound upon a drum $g$ on the carriage, and the third or rear tube $c$ has in like manner a pulley $c^2$, engaged by a wire rope or chain $i$, fastened to a pin $i'$ on the casing tube or socket $j$ and passing over pulleys $i^2\ e^2$ and drum $g'$.

To the rear end of the first tube $a$ is attached a rope or chain $k$, which passes around a pulley $m$ on the same shaft as the pulleys $e$, $e'$, and $e^2$, these four pulleys being simply jockeys or carriers and running loose upon the shaft. The rope $k$ is then wound upon the drum $g^2$ upon the same shaft $g^3$ as the drums $g$ and $g'$, but wound in the direction opposite to that in which the ropes $h$ and $i$ pass around the said drums, so as to unwind this rope while the said drums are winding on the ropes $h$ and $i$, and vice versa, or this latter drum may be otherwise arranged to work in a reverse manner to the drums $g$ and $g'$.

The three tubes are preferably caused to advance into the retort at differential speeds. In order to accomplish this, the ropes $h$ and $i$ are hauled in by the rotation of the drums $g$ and $g'$ in the desired proportions, the said drums varying in size accordingly, the rope $k$ being also paid out or unwound, so as to permit of the extension of the rams.

If the relative protrusions of the tubes are intended to be equal—that is, the front tube advancing three feet while the second advances two feet and the third one foot, and so on—the extent to which the first tube protrudes from the second, the second from the third, and the third from the socket being increased with equal pace, the ropes $h$, $i$, and $k$ are hauled in and let out in the ratio one to two to three, the action being as follows: By hauling in two feet of the rope $i$ the two inner laps of the said rope—that is, the length between the pin $i'$ and the pulley $c^2$ and the length between the pulley $c^2$ and the pulley $i^2$—are each shortened one foot, whereby the pulley $c^2$ and tube $c$ advance one foot, carrying forward the pin $h'$ and pulleys $h^2$ and $b^2$ a like distance. The advance of the pulley $h^2$ one foot along the rope $h$ shortens the two laps of the said rope $h$ between the pin $h'$ and pulley $h^2$ six inches each, and thus advances the pulley $b^2$ and tube $b$ a further six inches. At the same time the rope $h$ should be hauled in one foot by the drum $g$, shortening each lap of the rope $h$ between the pin $h'$ and the pulley $h^2$ to the extent of six inches, and this presses forward the pulley $b^2$ and tube $b$ the same distance, which, with the eighteen inches, as previously stated, makes a total advance of two feet or an additional protrusion from the tube $c$ of one foot. The effect of this advance of the tube $b$, carrying the pulley $d^2$ two feet along the rope $d$, is to advance the pulley $a^2$ three feet—namely, two feet by reason of the forward movement of the pulley $d^2$ and pin $d'$, both of which are carried by the tube $b$, and one foot by reason of the lengthening of the outer lap of the rope $d$—and consequent shortening of the inner laps between the said pulley and pin, no hauling in of the rope $d$ being required, making a total advance of three feet, of which one foot represents the gain in protrusion from the tube $b$. All the movements of the three tubes are of course proceeding simultaneously. To collapse or withdraw the three tubes when thus extended, the ropes $h$ and $i$ are let out in the proportion in which they were hauled in, and the tail-rope $k$ is hauled in. If, as in the last instance, this rope $k$ draws back the pulley $a^2$ on the tube $a$ three feet, this lengthens the two inner laps of the rope $d$ one foot each and draws back the pulley $d^2$ and pin $d'$ each two feet, carrying back the tube $b$ two feet. This withdrawal of the tube $b$ lengthens the two inner laps of the rope $h$ one foot each, taking in two feet of the outer lap of the rope $h$, of which one foot is unwound from the drum $g$ and one foot is obtained by drawing back the pulley $h^2$ (and pin $h'$) one foot. This pulley and pin being on the rear tube $c$, such withdrawal by lengthening the two inner laps of the rope $i$ one foot each takes up the two feet of rope unwound from the drum $g'$.

It will be readily understood that the rope or ropes may be wound in a variety of ways to produce the desired result. For instance, we may dispense with the drum $g$ and allow the rope $h$, like the rope $d$, to be of fixed length by substituting for the pin $h'$ another pulley or pair of pulleys similar to $h^2$, the ends of rope $h$ being carried back from such additional pulley to fixed points upon the socket $j$ or elsewhere. The effect of this will be to cause an advance of the tube $b$ of two feet or a protrusion of one foot beyond the tube $c$ by reason of the advance of the pulleys on the opposite sides of the tube $c$ one foot each and of the shortening of each inner lap of the rope $h$ one foot to compensate for the lengthening of the outer laps thereof in consequence of such advance of the pulleys.

We might otherwise arrange pulleys in place of all the fastening-pins $d'$, $h'$, and $i'$ and connect all the six pairs of pulleys by a single rope, also passing around the pulleys $a^2$, $b^2$, and $c^2$ and having one end fixed and the other end hauled in by the drum $g'$, so as to extend all the tubes proportionately, this arrangement being shown in the diagram Fig. 5.

The tubes may, if desired, be arranged to advance independently—that is to say, tube $c$ to complete its outward stroke, then tube $b$, and lastly tube $a$; on the return stroke tube $a$ to be first withdrawn, then tube $b$, and lastly tube $c$—the drums or the like which haul in the ropes being engaged and disengaged by suitable clutches at the proper period, this arrangement having the advantage that the lap of one tube within the other would only be required to slide at the time when it had its minimum load, due to the extension of the ram.

The casing tube or socket $j$, carrying the water-tank $f$, may be itself advanced and withdrawn by suitable mechanism in coöperation with the movements of the tubes $a$, $b$, and $c$.

In discharging retorts which are clear through—that is, not divided by a partition—the tubes may be so arranged as to give the action of a ram throughout the stroke, so as to push out all the coke at the farther end, or may be tilted or inclined clear of the coke until the working head $a'$ is, say, half-way through the retort, then lowered so as to rake out half the coke at the near end in its return stroke, and again advanced to push out the other half at the farther end. The deflecting may be accomplished by any suitable means, such as an eccentric $n$, acting on the semicircular loop $o$, which supports the socket $j$ behind its pivot $j'$ and on the reversal of the direction of rotation of the shaft $g^3$ to draw back the rams. The eccentric $n$ is turned by hand to any desired position.

A handle $n'$ is provided for operating the eccentric $n$, and $n^2$ is a pin which connects the handle with a bar $n^3$, and thereby holds the eccentric in position.

Instead of the whole of the ram being tubular only the portion thereof which enters the retorts may be tubular, the remainder being a framework arranged to travel in the main framework of the machine.

In order to cool the tubes $a$ $b$ $c$ while in and after contact with the hot coke, the tank $f$ may be filled with water and may be in free communication with all the small annular spaces between the tubes, suitable stuffing-boxes $b^3$, $c^3$, and $j^2$ being provided to prevent the escape of water at the joint or overlap of each tube. Thus the tank and annular spaces can be kept about half-full of water when the tubes $a$ $b$ $c$ are extended and quite full when withdrawn.

The operations of raising and lowering the rams and rotating the shaft $g^3$ to extend or collapse the rams as previously described may be performed in any suitable manner; but we have here illustrated means of performing these operations by power obtained from an electromotor $t$, on the shaft $q$ of which is a worm $q'$, driving a worm-wheel $g^4$ on the shaft $g^3$. (See Fig. 6.) At the end of the said shaft $q$ any approved driving mechanism, such as that shown in Fig. 6, may be provided for conveying rotary motion to the pinion $s$ engaging the rack $s'$ on the carriage for raising and lowering the plate $s^2$, and thereby the rams. (See Fig. 1.) Suitable clutches may be employed, controlled, respectively, by the handle $r$, to disengage the driving connections between the shaft $q$ and the shaft $g^3$ while the pinion $s$ is working and by the handle $r'$ to stop the said shaft $q$ from driving the pinion $s$ when the shaft $g^3$ is operating the hauling-ropes. Such a clutch is shown, by way of example, in Fig. 6, where the worm $q'$ runs freely upon the shaft $q$ until engaged by the clutch $r^2$, keyed on the shaft $q$. This clutch has a neck surrounded by a loose collar $r^3$, such collar being linked to the spindle $r^4$ of the handle or lever $r$, so that by actuating the said handle $r$ the clutch $r^2$ may be drawn clear of the worm $q'$. A similar clutch, controlled by the handle $r'$, Fig. 1, may be applied to the worm (not shown) on the end of the shaft $q$, which connects with the pinion $s$.

The traveling base or carriage $v$, which traverses the rake or ram along the retort-house, has previously been made with four wheels adapted to travel on a pair of rails and has been of somewhat massive construction in order to resist the strain or stress caused by the rake working against the inert coke without being canted over. Instead of this we may employ a carriage running on two wheels $w$ $w'$ on a single rail in the floor and having an upward extension carrying one or more pairs of horizontal or other guide-pulleys $x$ $x'$ $x^2$ $x^3$, engaging with an overhead guide-rail $y$. A motor $z$ is shown as being employed for traversing the carriage $v$ along the rails. This carriage is shown as having only two main uprights; but it can, of course, have four or other number.

We claim as our invention—

1. In a coke-drawing machine, the combination, with a supporting-carriage, of a casing-tube pivoted in the said carriage and provided with a loop, a telescopic ram carried by the said casing-tube, and an eccentric pivoted to the said carriage and engaging with the said loop and affording a means for turning the said casing-tube on its pivots.

2. In a coke-drawing machine, the combination, with a supporting-carriage, and a casing-tube supported in the said carriage and provided with a tank for cooling-water; of a telescopic ram provided with spaces for cooling-water which communicate constantly with the said tank, and driving mechanism for telescoping the said ram and causing the cooling-water to move back and forth in the said water-spaces and tank.

3. In a coke-drawing machine, the combination, with a supporting-carriage, and a casing-tube supported in the said carriage and provided with a tank for cooling-water at its rear end; of a telescopic ram provided with spaces for cooling-water which communicate constantly with the said tank, guide-sheaves carried by the said ram, guide-sheaves journaled in the said tank, flexible connections operatively connected with the said ram and passing over the said guide-sheaves, and winding mechanism supported by the said carriage and having the said flexible connections attached to it.

4. In a coke-drawing machine, the combination, with a single lower rail, and a single upper rail, and means for holding the said rails in position; of a carriage provided with wheels for engaging the said rails, a telescopic ram supported by the said carriage, and driving mechanism for telescoping the said ram also supported by the said carriage.

In testimony whereof we affix our signatures in presence of two witnesses.

JOHN WILSON BROADHEAD.
FRANCIS WESSELY ORDISH.

Witnesses:
ERNEST PRIESTLEY NEWTON,
JOHN ERNEST SYKES LOCKWOOD.